United States Patent
Leuck et al.

(10) Patent No.: US 11,505,305 B1
(45) Date of Patent: Nov. 22, 2022

(54) COMPOSITE AIRFOIL WITH ROLLED FIBERGLASS REINFORCED LEADING EDGE

(71) Applicant: Wisk Aero LLC, Mountain View, CA (US)

(72) Inventors: Cody Patrick Leuck, Saratoga, CA (US); Bernard F. Ahyow, Sunnyvale, CA (US)

(73) Assignee: Wisk Aero LLC, Mountain View, CA (US)

( * ) Notice: Subject to any disclaimer, the term of this patent is extended or adjusted under 35 U.S.C. 154(b) by 51 days.

(21) Appl. No.: 16/824,513

(22) Filed: Mar. 19, 2020

Related U.S. Application Data

(63) Continuation of application No. 15/799,819, filed on Oct. 31, 2017, now Pat. No. 10,640,197.

(51) Int. Cl.
  *B64C 11/26* (2006.01)
  *B29D 99/00* (2010.01)
  *B64C 3/20* (2006.01)

(52) U.S. Cl.
  CPC .......... *B64C 11/26* (2013.01); *B29D 99/0025* (2013.01); *B64C 3/20* (2013.01)

(58) Field of Classification Search
  CPC ........ F03D 1/0633; F03D 1/0675; F01D 5/14; F01D 5/147; F01D 5/282; F01D 5/286; B64C 11/26; B64C 2027/4736
  See application file for complete search history.

(56) References Cited

U.S. PATENT DOCUMENTS

| | | | |
|---|---|---|---|
| 4,298,417 A | 11/1981 | Euler et al. | |
| 5,041,182 A | 8/1991 | Sekiguchi et al. | |
| 5,222,297 A | 6/1993 | Graff et al. | |
| 5,392,514 A * | 2/1995 | Cook | B29C 70/86 |
| | | | 29/889.71 |

OTHER PUBLICATIONS

U.S. Appl. No. 15/799,819, "Non-Final Office Action", dated Jun. 1, 2018, 8 pages.
U.S. Appl. No. 15/799,819, "Final Office Action", dated Feb. 7, 2019, 8 pages.
U.S. Appl. No. 15/799,819, "Non-Final Office Action", dated Jun. 12, 2019, 8 pages.
U.S. Appl. No. 15/799,819, "Notice of Allowance", dated Jan. 2, 2020, 7 pages.

\* cited by examiner

*Primary Examiner* — Woody A Lee, Jr.
*Assistant Examiner* — Cameron A Corday
(74) *Attorney, Agent, or Firm* — Kilpatrick Townsend & Stockton LLP

(57) ABSTRACT

A composite airfoil is disclosed. In various embodiments, a composite airfoil as disclosed herein includes an outer skin comprising one or more layers of carbon fiber composite material, the outer skin defining an aerodynamic surface having a leading edge; and a reinforcement material comprising a roll of fiberglass reinforced fabric positioned behind the outer skin along at least a portion of the leading edge.

20 Claims, 5 Drawing Sheets

COMPOSITE AIRFOIL WITH ROLLED FIBERGLASS REINFORCED LEADING EDGE

CROSS-REFERENCE TO RELATED APPLICATIONS

This application claims the benefit of U.S. Non-Provisional application Ser. No. 15/799,819, filed Oct. 31, 2017, entitled "Composite Airfoil with Rolled Fiberglass Reinforced Leading Edge" which is incorporated herein by reference in its entirety.

BACKGROUND OF THE INVENTION

All-electric, vertical (or short) takeoff and landing (VTOL) aircraft have been proposed to provide a small scale, personal aircraft. Some designs use lift fans driven by electric motors, powered by one or more onboard batteries, to provide lift during takeoff and landing, and one or more electric-driven propellers to operate in forward flight.

To provide adequate range and make it more feasible to provide a VTOL aircraft that is all-electric, lightweight materials, such as composite materials, may be required for structural and aerodynamic members such as the aircraft fuselage, wings, aerodynamic control surfaces (e.g., ailerons, rudders, etc.), and lift fans, propellers, or other rotors.

To operate in a real world environment, aircraft components made of composite materials must be durable, including along leading edges of aircraft structures that move through the air at high speed, such as wings, propeller blades, and lift fan or other rotor blades. Such leading edges, in particular, must be able to withstand aerodynamic forces, other forces (e.g., vibration), and impact from debris, etc.

BRIEF DESCRIPTION OF THE DRAWINGS

Various embodiments of the invention are disclosed in the following detailed description and the accompanying drawings.

DETAILED DESCRIPTION

Figure 1:
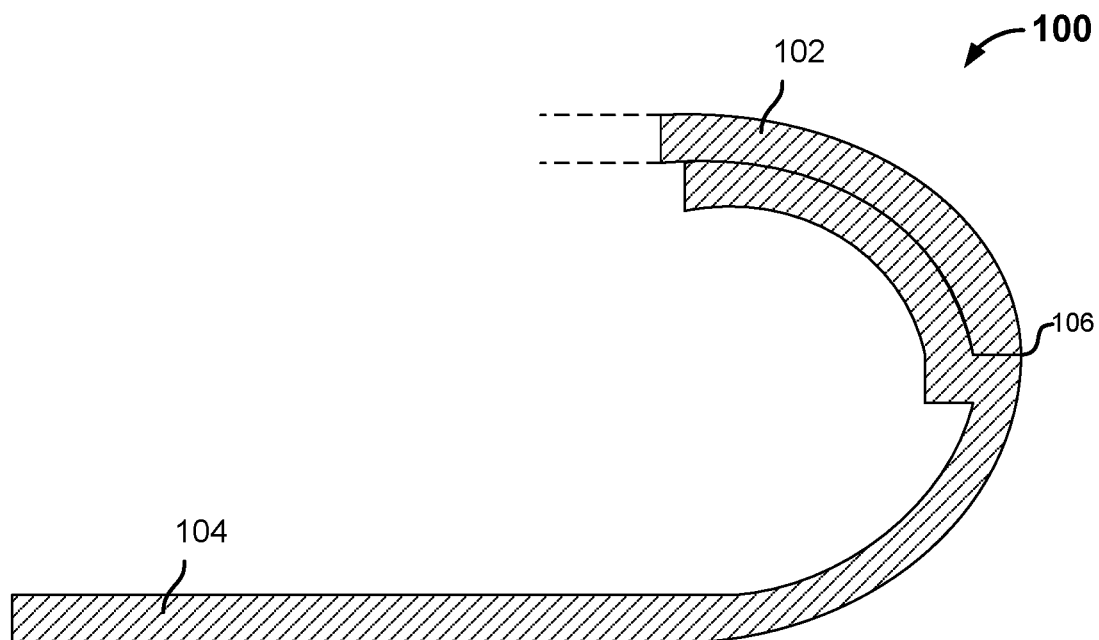
FIG. 1 is a diagram illustrating an embodiment of a composite airfoil.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A composite airfoil with a rolled fiberglass-reinforced leading edge is disclosed. Examples of a composite airfoil include, without limitation, propeller, lift fan, or other rotor blades; and wings, vertical stabilizers, and horizontal stabilizers, e.g., tails. In various embodiments, a composite airfoil as disclosed herein includes a fiberglass reinforcement along the leading edge. Fiberglass fabric may be rolled, pressed into position along a leading edge of a composite material stack (e.g., carbon fiber reinforced fabric), and cured together with the stack of composite material. In some embodiments, a silicone block or a block made of material with relatively high thermal expansion characteristic(s) may be used to press the reinforcing material into place along the leading edge of the composite structure, e.g., by expanding during heat curing and as a result pressing the reinforcing material into the leading edge portion of the composite structure. In some embodiments, the block may press the reinforcing material and the leading edge portion of the composite material into a mold or other form configured to shape the leading of the resulting composite structure in a desired manner, e.g., to facilitate secure bonding with another composite structure.

FIG. 1 is a diagram illustrating an embodiment of a composite airfoil. In the example shown, composite airfoil 100 includes an upper skin 102 bonded to a bottom skin 104 along a leading edge bond line 106. A structure as shown in FIG. 1 may be used to provide a lightweight airfoil, e.g., for power generation, electric or other lightweight aircraft, etc. Structure members internal to the airfoil 100, not shown in FIG. 1, such as spars, ribs, etc., may be used to reinforce the airfoil 100, e.g., by supporting and maintaining the spacing of the upper skin 102 and bottom skin 104, and providing rigidity for the airfoil 100.

An airfoil such as airfoil 100 may be used in environments that could result in debris contacting the leading edge of the airfoil 100 as it moves through the air (or other medium). For example, small foreign objects may be blown into the air when an aircraft embodying airfoil 100 is near the grounds, such as during taxi, takeoff, or landing, and larger flying objects, such as drones, birds, etc., may be contacted in flight. Contact with such debris could damage the composite material of the upper skin 102 and/or bottom skin 104 along the leading edge of the airfoil 100, having undesirable effects on the aerodynamic properties and/or performance of the airfoil 100. For example, such damage could result in higher drag, increased vibration, or other undesired effects. In an extreme case, the integrity of the bond line 106 may be compromised.

A composite airfoil having a rolled fiberglass-reinforced leading edge is disclosed. In various embodiments, the rolled fiberglass reinforces the leading edge, providing increased rigidity and durability without adding too much weight. In some embodiments, the rolled fiberglass reinforcement is integrated into a composite airfoil in a manner that facilitates manufacture and increases the strength and durability of a bond between adjoining composite structures comprising a composite airfoil as disclosed herein.

In various embodiments, airfoils as disclosed herein may be used in a variety of aviation and other contexts, including without limitation to provide composite propellers, lift fan rotors, and other rotors; aircraft wings, tails, and stabilizers; wind turbine blades; composite sails, rudders, or other maritime craft aerodynamic or hydrodynamic structures; etc.

Figure 2:
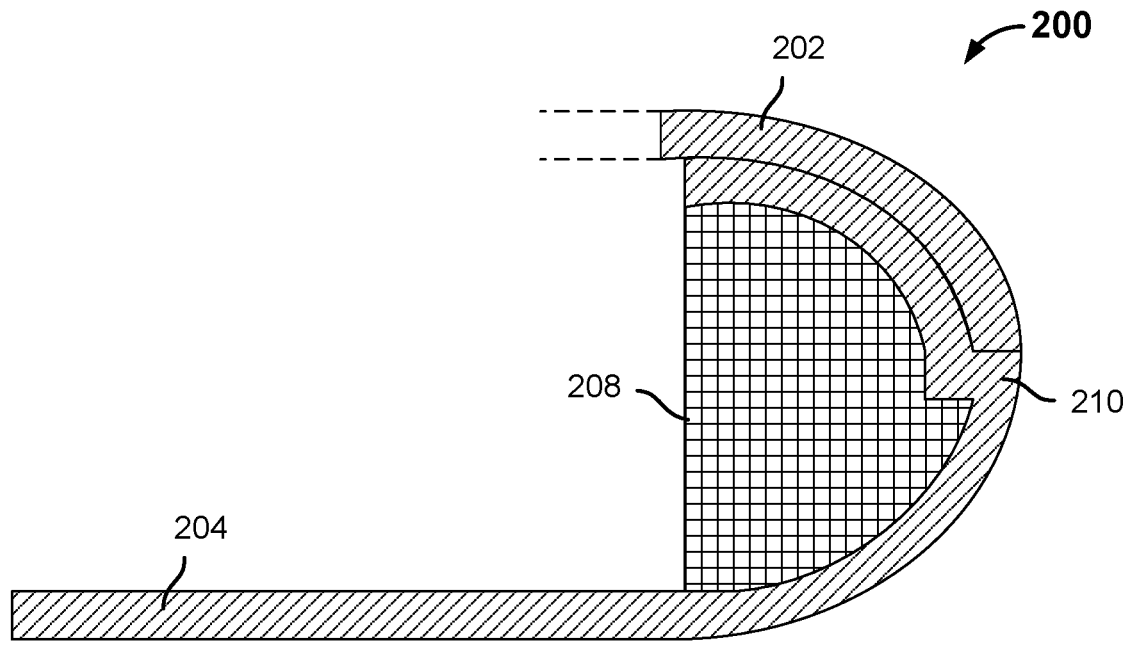
FIG. 2 is a diagram illustrating an embodiment of a composite airfoil having a rolled fiberglass-reinforced leading edge.

FIG. 2 is a diagram illustrating an embodiment of a composite airfoil having a rolled fiberglass-reinforced leading edge. In the example shown, airfoil 200 includes an upper skin 202 and overlays and is bonded to a lower skin 204. A leading edge of the airfoil 200 is reinforced by compressed and cured rolled fiberglass material 208. In some embodiments, fiberglass material 208 is formed by using a template to cut one or more layers of fiberglass reinforced fabric (e.g., prepreg), laying up the fiberglass reinforce material to form a stack, rolling the stack staring at one edge to form a roll or "noodle", positioning the rolled fiberglass material on carbon fiber material stack in a mold or form associated with lower skin 204, and curing the resulting combined stack in a manner that presses the rolled fiberglass into the leading edge of lower skin 204 to form fiberglass reinforcing material 208 as shown.

In the example shown in FIG. 2, the fiberglass material 208 and lower skin 204 have been pressed together and cured in a mold having a shape configured to cause a ledge (relief feature) 210 to be formed in the combined lower skin 204 and fiberglass reinforcing material 208. In the example shown, forming the lower skin 204 with the ledge 210, as shown, enables upper skin 202 to be bonded to lower skin 204 is a manner that results in little or no overhang, achieving low drag while also providing a relatively high area of overlap between the upper skin 202 and lower skin 204 along the leading edge, enabling a stronger bond between the upper skin 202 and lower skin 204 to be formed (as compared, by way of example, to the airfoil 100 of FIG. 1).

Figure 3A:
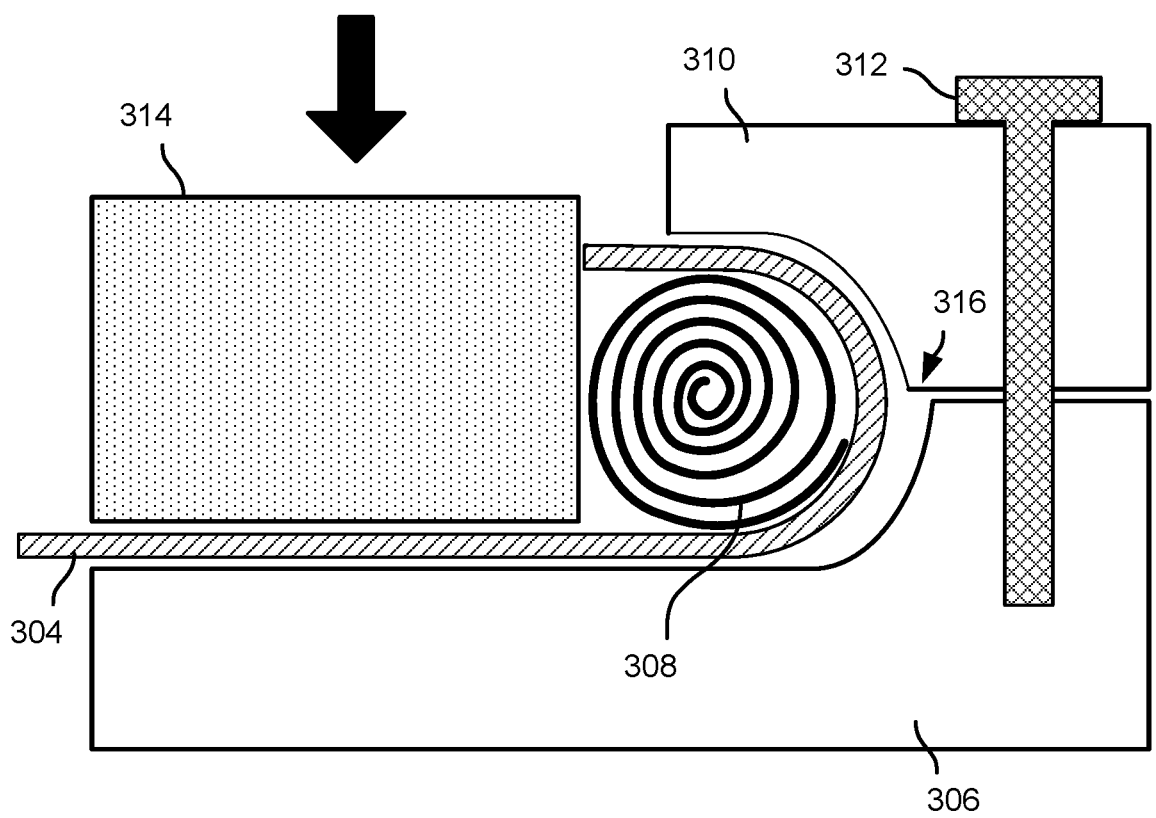
FIG. 3A is a diagram illustrating an embodiment of a process to fabricate a composite airfoil having a rolled fiberglass-reinforced leading edge.

FIG. 3A is a diagram illustrating an embodiment of a process to fabricate a composite airfoil having a rolled fiberglass-reinforced leading edge. In various embodiments, the process of FIG. 3A may be included in a process to fabricate a composite airfoil having a rolled fiberglass-reinforced leading edge, such as airfoil 200 of FIG. 2. In the example shown, one or more layers of carbon fiber-reinforced material (pre-preg) are shown to be layed on a lower mold (or tool) 306. A roll of fiberglass fabric 308 is position along a leading edge portion of the carbon fiber-reinforced material 304, which in the example shown is folded back over the rolled fiberglass fabric 308. An upper mold (tool) 310 is fastened to lower mold (tool) 306, using a machine screw 312 or other fastener. Upper mold 310 and lower mold 306 are offset from each other, at a leading edge region, to create an overhang 316.

In the example shown, a block 314 made of silicone rubber (or other material having desired thermal expansion characteristics) is positioned on the carbon fiber-reinforced fabric 304 at a position adjacent to the rolled fiberglass precursor fabric 308. Downward pressure (indicated by downward pointing arrow) is applied to the block 314 during heat curing of the combined assembly shown in FIG. 3A. The heat causes the silicone rubber block 314 to expand during curing, applying pressure to the rolled fiberglass 308 as the combined assembly is cured.

Figure 3B:
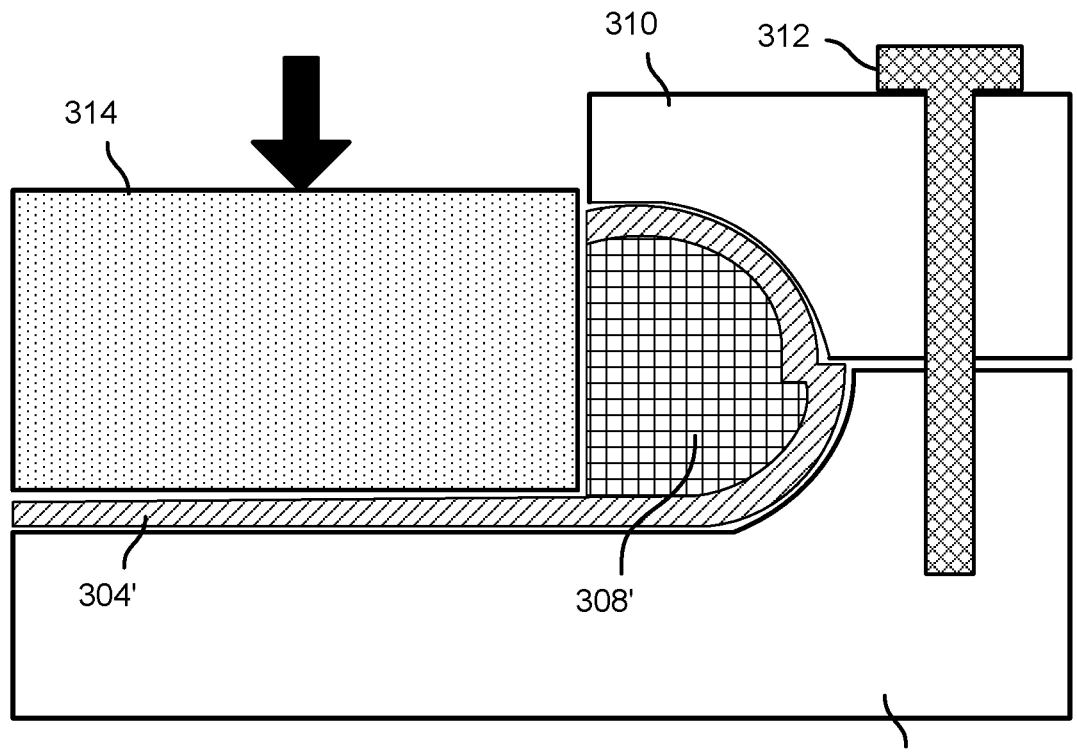
FIG. 3B is a diagram illustrating an embodiment of a process to fabricate a composite airfoil having a rolled fiberglass-reinforced leading edge.

FIG. 3B is a diagram illustrating an embodiment of a process to fabricate a composite airfoil having a rolled fiberglass-reinforced leading edge. In the example shown, the fiberglass material 308 and carbon fiber-reinforced fabric 304 of FIG. 3A have been cured together, with block 314 positioned as shown in FIG. 3A, resulting in a lower composite skin 304' reinforced along the leading edge by cured fiberglass material 308', corresponding in some embodiments to the lower skin 204 and fiberglass material 208 of the airfoil 200 of FIG. 2.

Figure 4A:
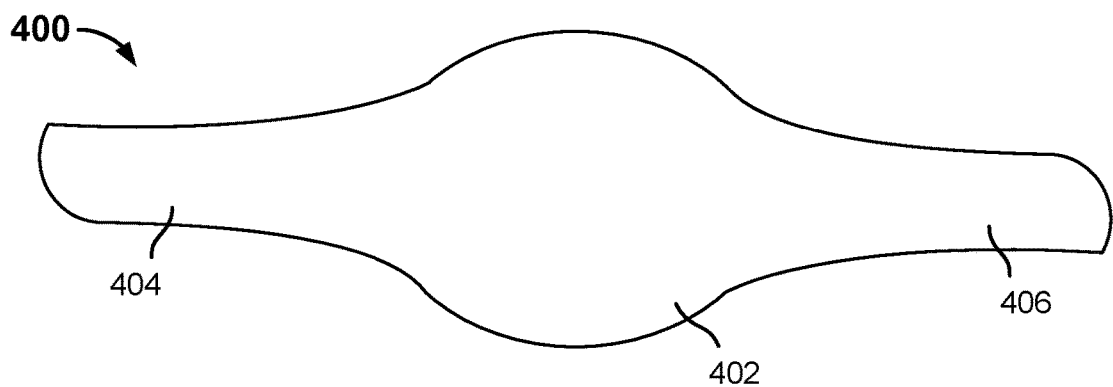
FIG. 4A is a diagram illustrating a top plan view of an embodiment of a lift fan rotor comprising a composite airfoil having a rolled fiberglass-reinforced leading edge.

FIG. 4A is a diagram illustrating a top plan view of an embodiment of a lift fan rotor comprising a composite airfoil having a rolled fiberglass-reinforced leading edge. In the example shown, lift fan rotor 400 includes a central hub or disk portion 402, a left blade (as shown) 404, and a right blade 406. In various embodiments, an electric-powered vertical takeoff and landing (VTOL) aircraft may include a plurality of lift fans, each including one or more rotors such as rotor 400. In the example shown in FIG. 4A, the leading edge of left blade 404 and right blade 406, respectively, are shown to be non-linear in shape. Other rotor blades may have other shapes along the leading edge.

Figure 4B:
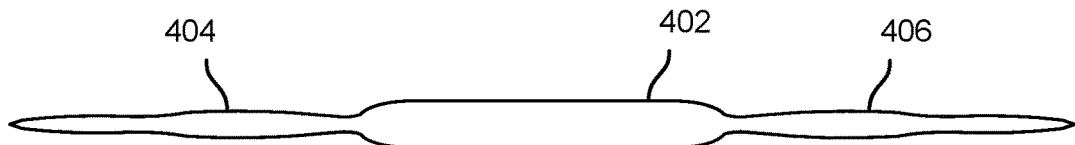
FIG. 4B is a diagram illustrating a front elevation view of the lift fan rotor of FIG. 4A.

FIG. 4B is a diagram illustrating a front elevation view of the lift fan rotor of FIG. 4A. In the example shown, the left blade 404 and right blade 406 of rotor 400 are shown to vary in width along a longitudinal dimension of blade 404, 406. For example, the blades 404, 406 are relatively thin near the disk 402 and at the distal end (tip) and relatively thicker in the region in between. Other rotor blades may vary in thickness in other ways.

Figure 4C:
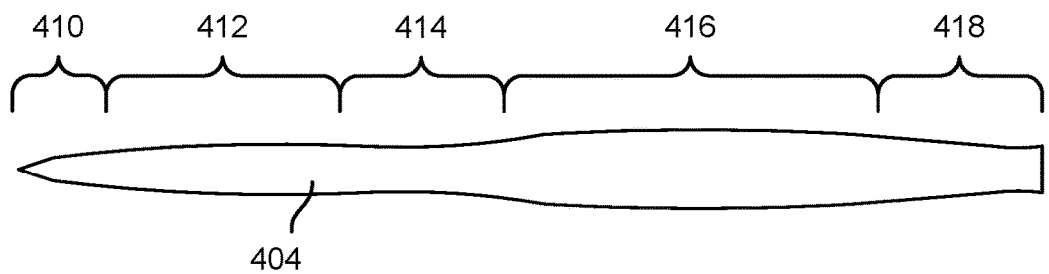
FIG. 4C is a diagram illustrating a close-up view of the left rotor blade of the lift fan of FIGS. 4A and 4B.

FIG. 4C is a diagram illustrating a close-up view of the left rotor blade of the lift fan of FIGS. 4A and 4B. In the example shown, blade 404 is shown to have a different blade thickness in segments 410, 412, 414, 416, and 418, respectively. In this example, the blade 404 is thinner in segments 410 and 414 than in segment 412, and likewise is thinner in segments 414 and 418 than in segment 416.

In various embodiments, to fabricate a rotor blade with rolled fiberglass reinforcement at the leading edge, a template or other pattern is used to cut resin-impregnated fiberglass fabric (prepreg) in a shape determined by engineers to result in a stack of one or more layers of fiberglass prepreg fabric which, when rolled, will yield a noodle-like roll the thickness of which varies along its length. In various embodiments, such a roll may be positioned in a mold or form used to shape and cure rotor blades or portions thereof, such as the mold 306, 310 shown in FIGS. 3A and 3B. The shape of the pattern-cut fiberglass prepreg fabric is such that the thickness of the rolled fiberglass prepreg fabric varies in a manner that corresponds to how the thickness of the rotor blade varies along its leading edge.

Figure 5:
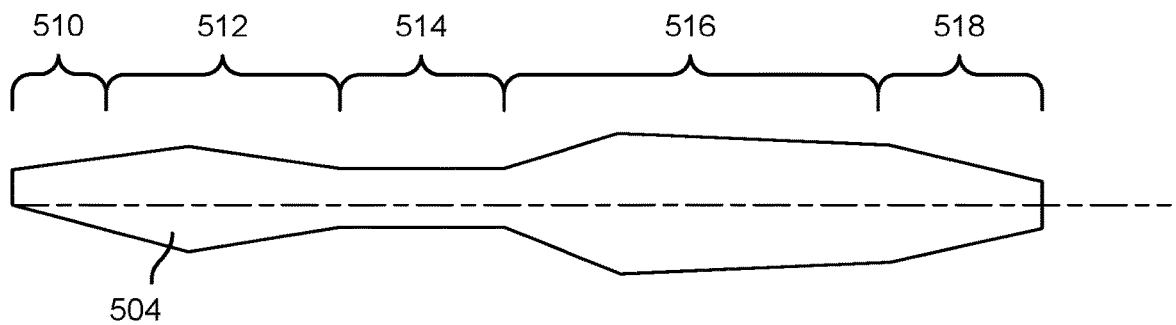
FIG. 5 is a diagram illustrating an embodiment of a layer of fiberglass prepreg fabric to be used to fabricate a composite airfoil having a rolled fiberglass-reinforced leading edge.

FIG. 5 is a diagram illustrating an embodiment of a layer of fiberglass prepreg fabric to be used to fabricate a composite airfoil having a rolled fiberglass-reinforced leading edge. In the example shown, fiberglass prepreg fabric 504 has been cut based on a template or other pattern having the shape shown. In this example, the width (y-dimension as shown) of the fiberglass prepreg fabric varies across segments 510, 512, 514, 516, and 518, corresponding in this example to the varying thickness of corresponding segments 410, 412, 414, 416, and 418 of blade 404 as shown in FIG. 4C.

Figure 6:
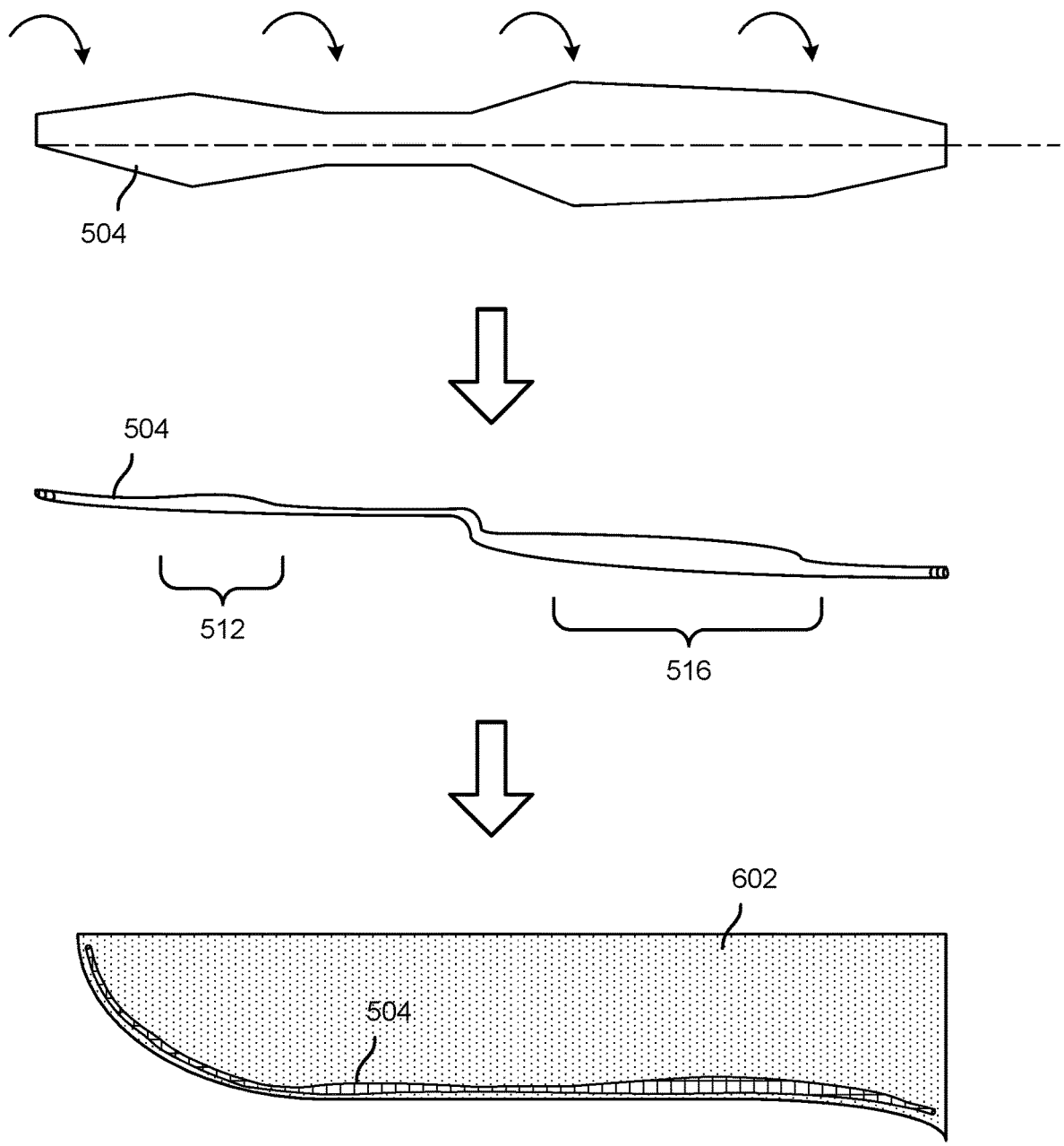
FIG. 6 is a diagram illustrating an embodiment of a process to fabricate a composite airfoil having a rolled fiberglass-reinforced leading edge.

FIG. 6 is a diagram illustrating an embodiment of a process to fabricate a composite airfoil having a rolled fiberglass-reinforced leading edge. In the example shown, pattern-cut fiberglass fabric 504 is shown to be rolled starting at a starting edge (top image) and rolling toward an opposite edge to form a noodle-like roll (middle image). In various embodiments, multiple layers of pattern-cut fiberglass prepreg fabric may be stacked and rolled together, e.g., to increase the thickness, strength, etc. of the resulting fiberglass reinforcing material in the end product airfoil (e.g., rotor blade).

In the example shown in FIG. 6, the varying width of fiberglass prepreg fabric along the length of the pattern-cut fiberglass prepreg fabric (top image) results in varying thickness along the length of the rolled fiberglass prepreg fabric (middle image). For example, the thickness of the rolled fiberglass at segments 512 and 516 is thicker than in other parts.

Referring to the bottom image of FIG. 6, the rolled fabric 504 is placed along a leading edge of a carbon fiber prepreg fabric 602 cut in a pattern associated with a rotor blade (in this example). In some embodiments, the carbon fiber prepreg fabric 602 may be placed in a form or mold, such as mold 306, 310 of FIGS. 3A and 3B, and heat cured under pressure, as described in connection with FIGS. 3A and 3B, to produce a rotor blade (or other airfoil) with a fiberglass reinforced leading edge.

Figure 7:
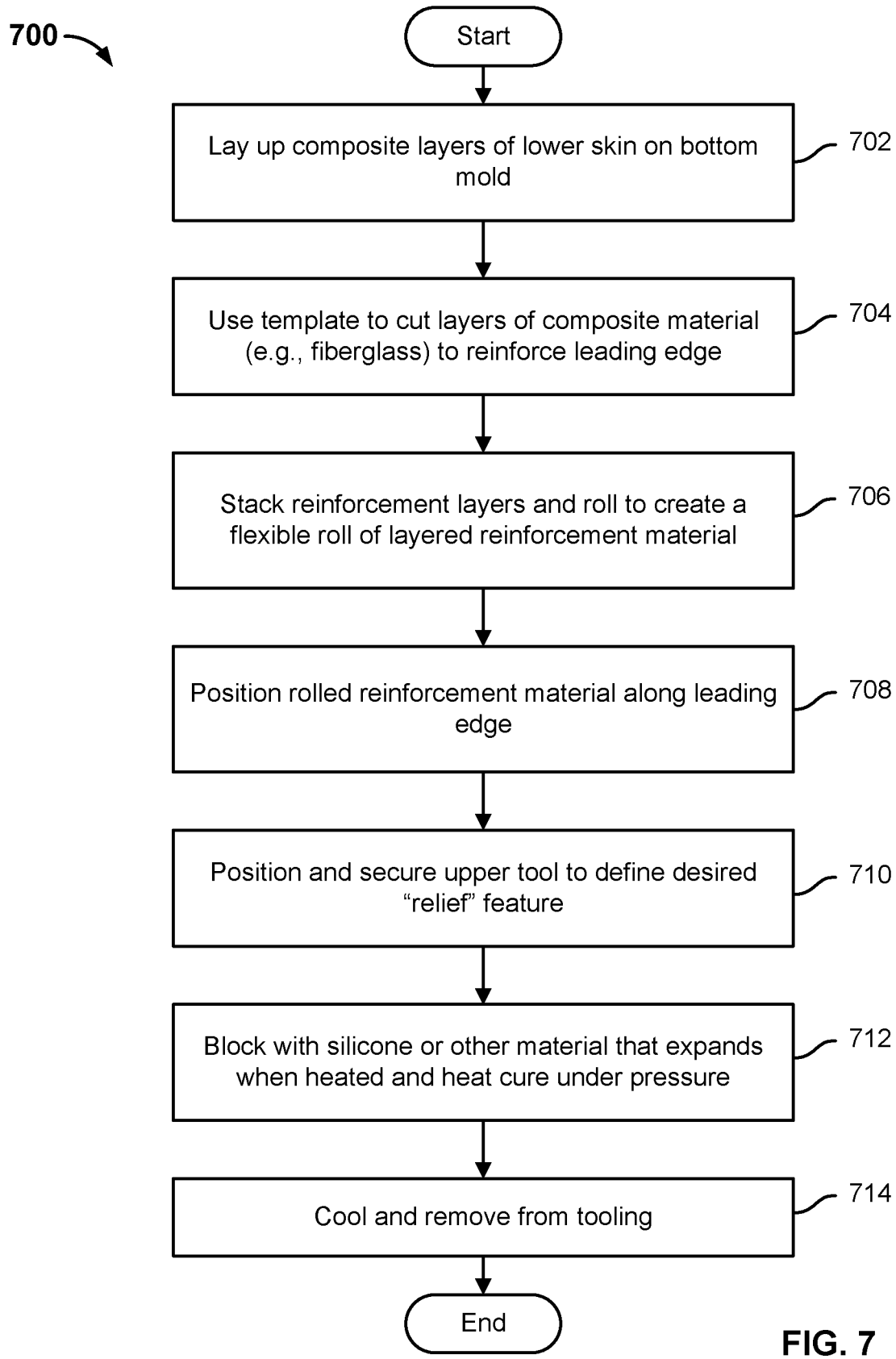
FIG. 7 is a flow chart illustrating an embodiment of a process to fabricate a composite airfoil having a rolled fiberglass-reinforced leading edge.

FIG. 7 is a flow chart illustrating an embodiment of a process to fabricate a composite airfoil having a rolled fiberglass-reinforced leading edge. In various embodiments, the process 700 of FIG. 7 may be used to fabricate a composite airfoil having a rolled fiberglass-reinforced leading edge, e.g., as shown in FIGS. 2, 3A, 3B, and 6. In the example shown, layers of composite material (prepreg fabric) to form a bottom skin of an airfoil (e.g., rotor blade) are laid up on a mold or form (702). A template is used to cut one or more layers of fiberglass prepreg fabric in a shape associated with varying thickness of an airfoil the leading edge of which is to be reinforced (704). The reinforcement (fiberglass fabric) layers are stacked and rolled to create a roll of fiberglass fabric (706). The rolled fiberglass fabric is positioned along a leading edge of the airfoil material laid up in step 702 (708). An upper tool or mold (e.g., upper mold 310 of FIGS. 3A and 3B) is positioned and secured (710). The rolled fiberglass fabric is blocked with silicone or another material having desired thermal expansion characteristics, and the assembly is heat cured while applying pressure to the silicone or other blocking material (712). The resulting cured composite structure is cooled and removed from the mold/tooling (714).

In subsequent steps, not shown in FIG. 7, the bottom skin with reinforced leading edge produced by the process 700 of FIG. 7 (corresponding, for example, to lower skin 204 and reinforcing material 208 of FIG. 2) may be bonded to an upper skin, such as upper skin 202 of FIG. 2. In various embodiments, structures internal to the airfoil may be bonded in place between the upper and lower skins, such as spars, ribs, or other supports.

Using techniques disclosed herein, in various embodiments, lightweight composite airfoils having durable leading edges may be produced.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A composite airfoil, comprising:
    an outer skin comprising one or more layers of carbon fiber composite material, the outer skin formed of an upper skin and a bottom skin and defining an aerodynamic surface having a leading edge; and
    a reinforcement material comprising fiberglass reinforced fabric positioned behind the outer skin along at least a portion of the leading edge,
    wherein the reinforcement material is positioned behind a portion of the bottom skin that wraps up and extends at least partly over the reinforcement material along the leading edge, the portion of the bottom skin defines a relief feature at the leading edge, wherein the relief feature is configured to receive a leading edge portion of the upper skin that overlaps a corresponding portion of the bottom skin terminating at a bond line at the leading edge, wherein an outer surface of the upper skin and an outer surface of the bottom skin are substantially flush with one another along the bond line at the leading edge.

2. The composite airfoil of claim 1, wherein the fiberglass reinforced fabric and the one or more layers of carbon fiber composite material are cured together to form the composite airfoil.

3. The composite airfoil of claim 1, wherein the fiberglass reinforced fabric is co-cured with the outer skin.

4. The composite airfoil of claim 1, wherein the fiberglass reinforced fabric is co-cured with the outer skin under pressure.

5. The composite airfoil of claim 4, wherein the pressure is applied at least in part by a block positioned behind the fiberglass reinforced fabric.

6. The composite airfoil of claim 5, wherein the block comprises material having a prescribed thermal expansion characteristic associated with expanding under the pressure and temperature conditions associated with curing the carbon fiber composite material and the fiberglass reinforced fabric.

7. The composite airfoil of claim 1, wherein the composite airfoil comprises one or more of a wing, a propeller, a lift fan, a rotor blade, a vertical stabilizer, or a horizontal stabilizer.

8. A method for forming a composite airfoil, the method comprising:

stacking one or more layers of carbon fiber reinforced material in a mold associated with a shape of the composite airfoil;

stacking one or more layers of fiberglass reinforced fabric;

positioning the fiberglass reinforced fabric along at least a leading edge portion of the carbon fiber reinforced material stacked in the mold;

curing the carbon fiber reinforced material and the fiberglass reinforced fabric under heat and pressure to form at least a portion of the composite airfoil including a bottom skin portion with a relief feature at the leading edge portion, wherein the relief feature is configured to receive a leading edge portion of an upper skin portion of the composite airfoil that overlaps a corresponding portion of the bottom skin portion terminating at a bond line at the leading edge portion, wherein an outer surface of the upper skin portion and an outer surface of the bottom skin portion are substantially flush with one another along the bond line at the leading edge portion.

9. The method of claim 8, further comprising:
using a template to cut the one or more layers of fiberglass reinforced fabric.

10. The method of claim 8, wherein the one or more layers of fiberglass reinforced fabric comprise a plurality of layers, each offset from one or more adjacent layers by a prescribed offset.

11. The method of claim 8, wherein the mold comprises a bottom mold and wherein curing the carbon fiber reinforced material and the fiberglass reinforced fabric under heat and pressure to form at least a portion of the composite airfoil comprises positioning and securing an upper mold on one or more of the bottom mold, the one or more layers of carbon fiber reinforced material, and the fiberglass reinforced fabric.

12. The method of claim 11, wherein the upper mold and the bottom mold that are fastened together using a fastener.

13. The method of claim 11, wherein the upper mold and the bottom mold that are offset from each other at a leading edge region creating an overhang, with the relief feature of the bottom skin portion is formed at the overhang of the mold.

14. The method of claim 13, further comprising:
positioning a block behind the fiberglass reinforced fabric; and
applying downward pressure on the block.

15. The method of claim 14, further comprising:
heat curing the block and the fiberglass reinforced fabric.

16. The method of claim 15, wherein the block comprises material having a thermal expansion characteristic under curing conditions associated with applying pressure to the fiberglass reinforced fabric from behind during curing.

17. The method of claim 8, wherein the composite airfoil comprises one or more of a wing, a propeller, a lift fan, a rotor blade, a vertical stabilizer, or a horizontal stabilizer.

18. The method of claim 8, further comprising:
prior to positioning the fiberglass reinforced fabric along at least the leading edge portion of the carbon fiber reinforced material stacked in the mold,
rolling the stacked one or more layers of fiberglass reinforced fabric to create a roll comprising fiberglass reinforced fabric.

19. A composite airfoil, wherein the composite airfoil is fabricated by the method of claim 8.

20. The composite airfoil of claim 1, wherein the composite airfoil comprises one or more of a propeller, a lift fan, a rotor blade, a vertical stabilizer, or a horizontal stabilizer.

* * * * *